United States Patent
Napchi et al.

(10) Patent No.: US 10,701,030 B2
(45) Date of Patent: Jun. 30, 2020

(54) REAL-TIME MONITORING OF WEB PAGE CODE

(71) Applicant: HIRO Media Ltd., Tel-Aviv (IL)

(72) Inventors: Ariel Napchi, Tel-Aviv (IL); Oded Napchi, Tel-Aviv (IL); Alan Oken, RaAnana (IL); Shahar Daniel, Tel-Aviv (IL)

(73) Assignee: HIRO Media Ltd., Tel-Aviv (IL)

(*) Notice: Subject to any disclaimer, the term of this patent is extended or adjusted under 35 U.S.C. 154(b) by 352 days.

(21) Appl. No.: 15/866,501

(22) Filed: Jan. 10, 2018

(65) Prior Publication Data

US 2018/0139180 A1 May 17, 2018

Related U.S. Application Data

(63) Continuation-in-part of application No. 15/422,490, filed on Feb. 2, 2017, now Pat. No. 10,304,084.

(Continued)

(51) Int. Cl.
| | |
|---|---|
| *H04L 29/06* | (2006.01) |
| *H04L 29/08* | (2006.01) |
| *H04L 12/26* | (2006.01) |
| *G06F 16/80* | (2019.01) |
| *G06F 16/958* | (2019.01) |

(Continued)

(52) U.S. Cl.
CPC .......... *H04L 63/0227* (2013.01); *G06F 16/80* (2019.01); *G06F 16/986* (2019.01);

(Continued)

(58) Field of Classification Search
CPC .. G06F 16/80; G06F 16/986; G06F 21/52–54; G06F 21/554; H04L 43/08;

(Continued)

(56) References Cited

U.S. PATENT DOCUMENTS

| 8,813,236 B1 | 8/2014 | Saha et al. |
| 9,009,834 B1 | 4/2015 | Ren et al. |

(Continued)

OTHER PUBLICATIONS

Applicant-Initiated Interview Summary dated Dec. 21, 2018 From U.S. Appl. No. 15/422,490. (3 pages).

(Continued)

*Primary Examiner* — Kevin Bechtel

(57) ABSTRACT

A method for monitoring web page code comprising: monitoring attempted actions and/or attempted events initiated by components of the web page code for manipulation of a document object model (DOM), the monitoring performed by a virtual DOM firewall that simulates the DOM by intercepting the attempted actions and/or attempted events targeting the DOM without execution of the attempted actions and/or attempted events on the DOM, and identifying a deviation from a set-of-rules defining allowable manipulation of the DOM, and prohibited manipulation of the DOM, wherein the virtual DOM firewall is stored on the web server and executed by the hardware processor of the web server in associated with the web page code, wherein attempted actions and/or attempted events that deviate from the set-of-rules are prevented from execution on the DOM, and attempted actions and/or attempted events that adhere to the set-of-rules are allowed to continue execution on the DOM.

36 Claims, 6 Drawing Sheets

Related U.S. Application Data

(60) Provisional application No. 62/358,607, filed on Jul. 6, 2016.

(51) Int. Cl.
   *G06F 21/55* (2013.01)
   *G06F 21/53* (2013.01)

(52) U.S. Cl.
   CPC ............ *G06F 21/53* (2013.01); *G06F 21/554* (2013.01); *H04L 43/08* (2013.01); *H04L 67/02* (2013.01)

(58) Field of Classification Search
   CPC ... H04L 63/0227; H04L 63/0245–0263; H04L 63/0281; H04L 63/10–108; H04L 63/1466; H04L 67/02–025; H04L 67/42
   See application file for complete search history.

(56) References Cited

U.S. PATENT DOCUMENTS

| | | |
|---|---|---|
| 9,032,066 B1 | 5/2015 | Erdmann |
| 2010/0011209 A1 | 1/2010 | Kiriansky et al. |
| 2014/0181631 A1* | 6/2014 | Lund ........................ H04L 67/10 715/234 |
| 2015/0341385 A1* | 11/2015 | Sivan .................. H04L 63/1466 726/23 |
| 2016/0088015 A1 | 3/2016 | Sivan et al. |
| 2016/0249085 A1 | 8/2016 | Ben-Atiya et al. |
| 2016/0285894 A1 | 9/2016 | Nelms et al. |
| 2016/0371746 A1 | 12/2016 | Lidow et al. |
| 2018/0012256 A1 | 1/2018 | Napchi et al. |
| 2019/0132356 A1* | 5/2019 | Vargas Gonzalez ......................... H04L 63/1483 |
| 2019/0295127 A1 | 9/2019 | Napchi et al. |

OTHER PUBLICATIONS

Official Action dated Jul. 19, 2018 From U.S. Appl. No. 15/422,490. (51 pages).
Applicant-Initiated Interview Summary dated Nov. 22, 2017 From U.S. Appl. No. 15/422,490. (3 pages).
Official Action dated Aug. 9, 2017 From U.S. Appl. No. 15/422,490. (46 pages).
Official Action dated Mar. 22, 2017 From U.S. Appl. No. 15/422,490. (46 pages).

* cited by examiner

```
AnalyzeAndValidateAd(adObj : DisplayObject){ loaderSwfUrl = adObj.loaderInfo.url;

qualifiedClassName = getQualifiedClassName(adObj)

ValidateIfUrlAndClassArePermitted(loaderSwfUrl, qualifiedClassName)

if (adObj.hasOwnProperty("numChildren") && root.numChildren > 0) { for (var i:int = 0; i < root.numChildren; i++) { childObj = adObj.getChildAt(i)

AddChildrenToDataTree()

AnalyzeAndValidateAd (childObj)

- If the function to instrument is a Constructor
  - create a new constructor called ProxyConstructor and use it to replace the reference to Constructor that when invoked
    - creates a new instance from Constructor
    - create a new empty proxy object
    - for each member on the instance
      - if the member is a method
        - create a new method on the proxy that when invoked
          - calls the getCallingScript() function
          - returns the value of calling the instance method with the given arguments
      - otherwise the member is a property
        - if the property is settable create a property method on the proxy that when invoked
          - calls the getCallingScript() function
          - sets the instance property with the given value
        - if the property is gettable create a property method on the proxy that when invoked
          - calls the getCallingScript() function
          - returns the value of the instance property
  - for each static member of the Constructor or class
    - if the static member is a method
      - create a new static method on the ProxyConstructor that when invoked
        - calls the getCallingScript() function
        - calls the Constructor static method with the given arguments
    - otherwise the static member is a property
      - if the static property is settable create a static property method on the ProxyConstructor that when invoked
        - calls the getCallingScript() function
        - sets the Constructor static property with the given value
      - if the static property is gettable create a static property method on the ProxyConstructor that when invoked
        - calls the getCallingScript() function
        - returns the value of the Constructor static property
  - Replace the reference to Constructor with ProxyConstructor
- Otherwise if the function to proxy is a normal function
  - Create a new proxyFunction that when invoked
    - calls the getCallingScript() function
    - returns the value of calling the original function with the given arguments
  - Replace the reference to the original function with the proxyFunction

FIG. 5

# REAL-TIME MONITORING OF WEB PAGE CODE

RELATED APPLICATIONS

This application is a Continuation-In-Part (CIP) of U.S. patent application Ser. No. 15/422,490 filed on Feb. 2, 2017, which claims the benefit of priority under 35 USC § 119(e) of U.S. Provisional Patent Application No. 62/358,607 filed on Jul. 6, 2016. The contents of the above applications are all incorporated by reference as if fully set forth in their entirety.

FIELD AND BACKGROUND OF THE INVENTION

The present invention, in some embodiments thereof, relates to web page code and, more specifically, but not exclusively, to systems and methods for monitoring and blocking of actions executed by web page code.

SUMMARY OF THE INVENTION

According to a first aspect, a computer-implemented method for monitoring by a virtual document object model (DOM) firewall executed in response to a web browser request by a web browser rendering a web page, the method executed by at least one hardware processor of a web server hosting the web page code in network communication with a client terminal accessing the web page code hosted by the web-server, the method comprising: receiving over a network from the web browser executing on the client terminal, a request to access web code hosted by the web server, monitoring, by the monitoring code, at least one of attempted actions and attempted events initiated by each of a plurality of components of the web page code, wherein the at least one of attempted actions and attempted events include instructions for manipulation of a document object model (DOM) of the web page code, and the monitoring code includes a virtual DOM firewall that simulates the DOM by intercepting the at least one of attempted actions and attempted events targeting the DOM without execution of the at least one of attempted actions and attempted events on the DOM, identifying a deviation from a set-of-rules according to an analysis of the monitored at least one of attempted actions and attempted events, wherein the set-of-rules define allowable manipulation of the DOM, and prohibited manipulation of the DOM, wherein the virtual DOM firewall is stored on the web server and executed by the hardware processor of the web server in associated with the web page code, wherein a common set-of-rules is defined for the web page code for execution by the web server when each client terminal of a plurality of client terminals access the web page code, the set-of-rules are stored in association with the web server hosting the web page, and wherein the at least one of attempted actions and attempted events that deviate from the set-of-rules are prevented from execution on the DOM, and the at least one of attempted actions and attempted events that adhere to the set-of-rules are allowed to continue execution on the DOM.

According to a second aspect, a system for monitoring by a virtual document object model (DOM) firewall executed in response to a web browser request by a web browser rendering a web page, the system comprising: a non-transitory memory having stored thereon a code for execution by at least one hardware processor of a web server hosting web page code in network communication with a client terminal accessing the web page code hosted by the web-server, the code comprising: code for receiving over a network from the web browser executing on the client terminal, a request to access web code hosted by the web server, code for monitoring, by the monitoring code, at least one of attempted actions and attempted events initiated by each of a plurality of components of the web page code, wherein the at least one of attempted actions and attempted events include instructions for manipulation of a document object model (DOM) of the web page code, and the monitoring code includes a virtual DOM firewall that simulates the DOM by intercepting the at least one of attempted actions and attempted events targeting the DOM without execution of the at least one of attempted actions and attempted events on the DOM, code for identifying a deviation from a set-of-rules according to an analysis of the monitored at least one of attempted actions and attempted events, wherein the set-of-rules define allowable manipulation of the DOM, and prohibited manipulation of the DOM, wherein the virtual DOM firewall is stored on the web server and executed by the hardware processor of the web server in associated with the web page code, wherein a common set-of-rules is defined for the web page code for execution by the web server when each client terminal of a plurality of client terminals access the web page code, the set-of-rules are stored in association with the web server hosting the web page, and wherein the at least one of attempted actions and attempted events that deviate from the set-of-rules are prevented from execution on the DOM, and the at least one of attempted actions and attempted events that adhere to the set-of-rules are allowed to continue execution on the DOM.

According to a third aspect, a computer program product for monitoring by a virtual document object model (DOM) firewall executed in response to a web browser request by a web browser rendering a web page, the computer program product comprising: a non-transitory memory having stored thereon a code for execution by at least one hardware processor of a web server hosting web page code in network communication with a client terminal accessing the web page code hosted by the web-server, the code comprising: instructions for receiving over a network from the web browser executing on the client terminal, a request to access web code hosted by the web server, instructions for monitoring, by the monitoring code, at least one of attempted actions and attempted events initiated by each of a plurality of components of the web page code, wherein the at least one of attempted actions and attempted events include instructions for manipulation of a document object model (DOM) of the web page code, and the monitoring code includes a virtual DOM firewall that simulates the DOM by intercepting the at least one of attempted actions and attempted events targeting the DOM without execution of the at least one of attempted actions and attempted events on the DOM, instructions for identifying a deviation from a set-of-rules according to an analysis of the monitored at least one of attempted actions and attempted events, wherein the set-of-rules define allowable manipulation of the DOM, and prohibited manipulation of the DOM, wherein the virtual DOM firewall is stored on the web server and executed by the hardware processor of the web server in associated with the web page code, wherein a common set-of-rules is defined for the web page code for execution by the web server when each client terminal of a plurality of client terminals access the web page code, the set-of-rules are stored in association with the web server hosting the web page, and wherein the at least one of attempted actions and attempted events that deviate from the set-of-rules are prevented from execution on the DOM, and the at least one of attempted actions and attempted events that adhere to the set-of-rules are allowed to continue execution on the DOM.

Some implementations of the systems, methods, apparatus, and/or code instructions described herein relate to the technical problem of protecting the DOM of the web page code stored on a web server from executing impermissible actions and/or events on the DOM. The technical problem may relate to protecting the client terminals of the users accessing the web page code and/or protecting the web page code itself. The technical problem may relate to ensuring correct execution of the original web page code, and/or supervising third party code (e.g., originating from an external third party server) and/or supervising code originating from the client terminal accessing the web page code on the web server (e.g., user scripts, injected code, and/or hijack code). The technical problem may relate to protecting the web page code from malicious software installed on the client terminal that injects user-scripts into the webpage code, and/or third part code attempting to interact with the web page code.

Some implementations of the systems, methods, apparatus, and/or code instructions described herein improve computational efficiency of the web server hosting the web page code and executing the virtual DOM firewall. Computational efficiency is improved, for example, in terms of reduced computational time, reduced utilization of processing resources, and/or reduced utilization of data storage devices. Computational efficiency is improved, for example, by the virtual DOM firewall that allows for uninterrupted execution of the web page code (e.g., by the hardware processors the web server and/or when rendered on the client terminal by the web browser) and analyzes actions and/or events targeting the DOM. Computational efficiency is improved, for example, in comparison to other methods such as sandbox based methods that require additional processing and/or memory resources for pre-executing code and/or executing code in controlled environments using dedicated resources.

Some implementations of the systems, methods, apparatus, and/or code instructions described herein improve computational efficiency of the client terminal accessing the web page code. The computational efficiency may be improved by the virtual DOM firewall executing on the web server that intercepts the actions and/or events targeting the DOM in real time, which reduces the delay incurred by the client terminal in rendering and/or presenting the web page code on the display of the client terminal. The computational efficiency may be improved, for example, in comparison to other anti-malware methods that pre-analyze code and/or execute code in a sandbox prior to releasing the code to the client terminal.

In a further implementation form of the first, second, and third aspects, the monitoring comprises intercepting by the virtual DOM firewall, the at least one of attempted actions and attempted events for manipulation of the DOM, and allowing transmission of the intercepted the at least one of attempted actions and attempted events for manipulation of the DOM when no deviation from the set-of-rules is identified.

In a further implementation form of the first, second, and third aspects, the monitoring comprises intercepting by the virtual DOM firewall, the at least one of attempted actions and attempted events for manipulation of the DOM, and blocking transmission of the intercepted the at least one of attempted actions and attempted events for manipulation of the DOM when the deviation from the set-of-rules is identified.

In a further implementation form of the first, second, and third aspects, the virtual DOM firewall identifies the deviation from the set-of-rules before the DOM is manipulated according to the at least one of attempted actions and attempted events.

In a further implementation form of the first, second, and third aspects, the virtual DOM firewall identifies the deviation from the set-of-rules while the browser of the client terminal is accessing the web page code stored on the web server.

In a further implementation form of the first, second, and third aspects, the deviation from the set-of-rules is identified, further comprising transmitting by the virtual DOM firewall to the respective component of the web page code, a virtual reply in response to the at least one of attempted actions and attempted events, wherein the virtual reply includes false data indicative of simulated execution of the at least one of attempted actions and attempted events on the DOM without executing the at least one of attempted actions and attempted events on the DOM, wherein the virtual reply enables the web page code to continue execution without deviating from the set-of-rules.

In a further implementation form of the first, second, and third aspects, the method further comprises and/or the system further comprises code instructions for and/or the computer program product further comprises additional instructions for generating the virtual reply according to a simulation execution of the at least one of attempted actions and attempted events on the virtual DOM firewall that simulates the DOM without executing the at least one of attempted actions and attempted events on the DOM.

In a further implementation form of the first, second, and third aspects, the component of the web page code comprises malicious code injected by the browser executing on the client terminal accessing the web page code.

In a further implementation form of the first, second, and third aspects, the method further comprises and/or the system further comprises code instructions for and/or the computer program product further comprises additional instructions for adding an event handler that detects a mutation event to the DOM of the web page and analyzing a stack trace to determine a sub-component of the component associated with code that caused the mutation, and evaluating whether the mutation deviates from the set-of-rules.

In a further implementation form of the first, second, and third aspects, the method further comprises and/or the system further comprises code instructions for and/or the computer program product further comprises additional instructions for adding an event handler that detects a mutation event to the virtual DOM firewall that simulates the DOM of the web page and analyzing a stack trace to determine a sub-component of the component associated with code that caused the mutation.

In a further implementation form of the first, second, and third aspects, the virtual DOM firewall overrides JAVASCRIPT™ functions and analyzes a call stack within the JAVASCRIPT™ network request call to identify the component that originated the at least one of attempted actions and attempted events, and identifies a remote server hosting the component.

In a further implementation form of the first, second, and third aspects, the set-of-rules define playing a visual video on a display as an allowable component of the multi-media advertisement, and the set-of-rules define sound as a prohibited component of the multi-media advertisement, wherein a sound component of the multi-media advertisement is blocked while a visual component of the multi-media advertisement is allowed to continue playing on the display.

In a further implementation form of the first, second, and third aspects, the plurality of components include at least one web browser media object is a programmatic advertisement provided by an ad-server for dynamic loading with the web page by the web browser.

In a further implementation form of the first, second, and third aspects, the web page includes a plurality of designations each for placement of a respective component, wherein the web page includes a plurality of monitoring code instruction instances each for loading with an associated respective component, wherein the monitoring is performed by each monitoring code instance of the associated respective component, and wherein the identification of the deviation of each respective component is performed according to a respective set-of-rules defined for each respective component.

In a further implementation form of the first, second, and third aspects, each monitoring code instance monitors the associated respective component without monitoring other content of the web page or other components being monitored by other monitoring code instances.

In a further implementation form of the first, second, and third aspects, each monitoring code instance and associated component are loaded together within a respective frame of the web page, wherein the monitoring code instance monitors the at least one of attempted actions and attempted events from the associated component within the respective frame.

In a further implementation form of the first, second, and third aspects, the set-of-rules define the maximum loaded size of the component, and identifying comprises identifying a deviation above the maximum loaded size of the loaded component.

In a further implementation form of the first, second, and third aspects, the set-of-rules define undesired parameters leading to a degradation of a user experience of a user using the web browser to access the web page.

In a further implementation form of the first, second, and third aspects, the set-of-rules includes at least one member of the group consisting of: statistically significant network usage, statistically significant processing resource utilization, statistically significant user noticeable slow-down in loading of the web page, statistically significant user noticeable slowdown in execution of other applications running on the client terminal, and detection of malware.

In a further implementation form of the first, second, and third aspects, the method further comprises and/or the system further comprises code instructions for and/or the computer program product further comprises additional instructions for recursively monitoring loading of sub-frames within a loaded parent frame of the web page, and recursively monitoring the component within the loaded sub-frame and parent frame.

In a further implementation form of the first, second, and third aspects, monitoring comprises monitoring network activity associated with the monitored component.

In a further implementation form of the first, second, and third aspects, the set-of-rules is designed to detect at least one member of the group consisting of: component associated with an advertiser bot, frequency capping, and re-targeting.

In a further implementation form of the first, second, and third aspects, the set-of-rules define prohibited activity as activation of sound by the component.

In a further implementation form of the first, second, and third aspects, the method further comprises and/or the system further comprises code instructions for and/or the computer program product further comprises additional instructions for identifying the at least one of attempted actions and attempted events executed by each sub-component of the component to identify which certain sub-component of the component caused the deviation from the set-of-rules.

In a further implementation form of the first, second, and third aspects, monitoring comprises monitoring each technological platform implementation of the component.

In a further implementation form of the first, second, and third aspects, the technological platform implementation includes at least one member of the group consisting of: at least one programming language used to create the component, DOM representation of the component, interface used by the component, and network activity due to the component.

In a further implementation form of the first, second, and third aspects, the method further comprises and/or the system further comprises code instructions for and/or the computer program product further comprises additional instructions for creating a call chain of sub-components of each component.

In a further implementation form of the first, second, and third aspects, the call chain is created by analyzing call stacks to identify the connectivity between the sub-components of the component.

In a further implementation form of the first, second, and third aspects, the component includes a plurality of links to a plurality of resources located on at least one remote server, wherein the resources include instructions for execution by the web browser of the client terminal, wherein the resources are arranged in a hierarchy such that a first resource includes instructions to execute at least one second resource, further comprising tracking loading of each of the plurality of resources and creating a dependency graph representing the loading relationship between resources, wherein nodes of the graph represent resources of the component.

In a further implementation form of the first, second, and third aspects, tracking loading comprises at least one member selected from the group consisting of: time of loading relative to the start of the loading process of the web page, the location of the component resource in the web page relative to the root of a DOM of the web page.

In a further implementation form of the first, second, and third aspects, the dependency graph includes weights assigned between nodes of the graph representing at least one of the loading time and distance based on the screen location.

In a further implementation form of the first, second, and third aspects, the loading relationship of resources of components of the web page are analyzed for each loading session of the web page and added to a common graph created for the component representing an average of weights based on multiple sessions.

In a further implementation form of the first, second, and third aspects, the method further comprises and/or the system further comprises code instructions for and/or the computer program product further comprises additional instructions for applying a machine learning method to the graph to identify component resources violating the set-of-rules.

In a further implementation form of the first, second, and third aspects, the method further comprises and/or the system further comprises code instructions for and/or the computer program product further comprises additional instructions for blocking at least one component identified as deviating from the set-of-rules by automatically removing a designation for requesting the at least one component from the code of the web page.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is an example of monitoring code that detects recursive loading of components of the web page code, in accordance with some embodiments of the present invention;

FIG. 5 is an example of pseudo-code for creating an instrumentation constructor function implementation that monitors the stack trace, in accordance with some embodiments of the present invention.

DESCRIPTION OF SPECIFIC EMBODIMENTS OF THE INVENTION

Figure 1:
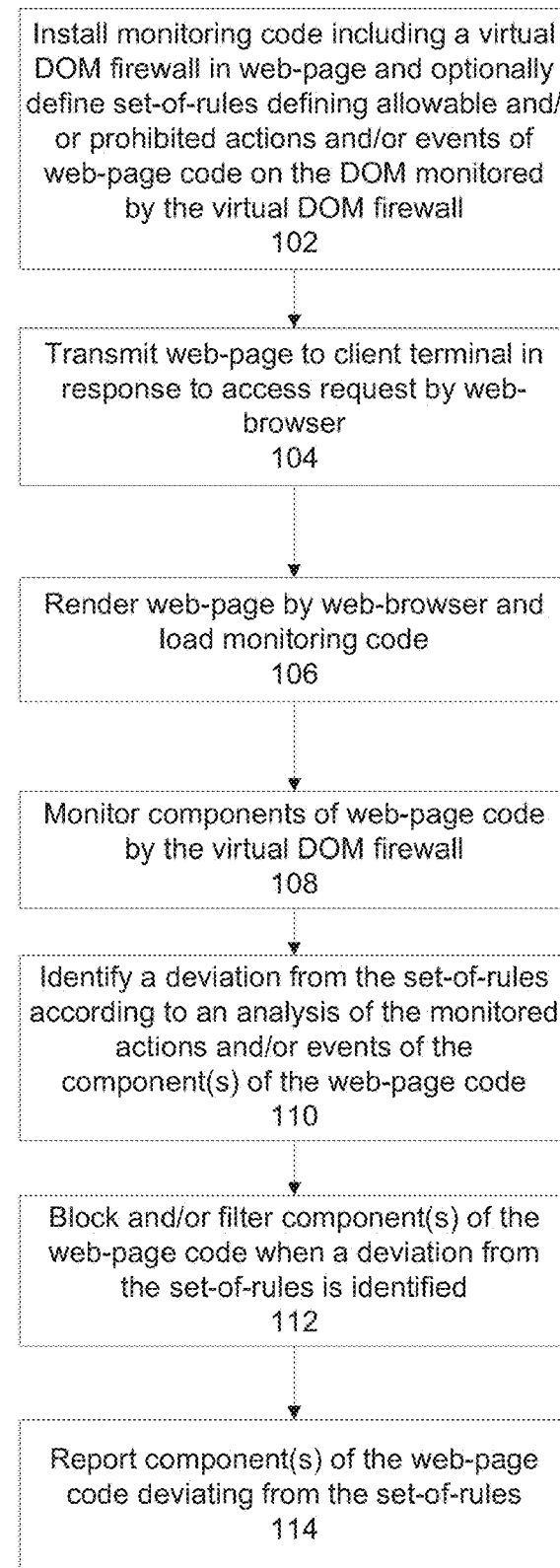
FIG. 1 is a flowchart of a method of monitoring web page code of a web page using monitoring-code located within the web page, in accordance with some embodiments of the present invention.

The present invention, in some embodiments thereof, relates to web page code and, more specifically, but not exclusively, to systems and methods for monitoring and blocking of actions executed by web page code.

An aspect of some embodiments of the present invention relates to systems, an apparatus, methods, and/or code instructions (stored in a data storage device, executable by one or more hardware processors) for providing a firewall to a document object model (DOM) of web page code stored on a web server. The firewall for the DOM is referred to herein as a virtual DOM, a virtual DOM firewall. The virtual DOM firewall, which is optionally installed on the web server hosting the web page code, monitors and/or intercepts attempted actions and/or events initiated by components of the web page code. The attempted actions and/or attempted events include instructions for manipulation of the DOM of the web page code. The virtual DOM firewall simulates the DOM and/or is located along the transmission path between the web page code and the DOM. The virtual DOM firewall intercepts the attempted actions and/or attempted events targeting the DOM without execution of attempted actions and/or attempted events on the DOM. The attempted actions and/or attempted events are analyzed to detect a deviation from a set-of-rules that define allowable manipulation of the DOM, and prohibited manipulation of the DOM. Attempted actions and/or attempted events that deviate from the set-of-rules are prevented from execution on the DOM. Attempted actions and/or attempted events that adhere to the set-of-rules are allowed to continue execution on the DOM.

Optionally, a common set-of-rules is defined for the web page code for execution by the web server when each of multiple client terminals access the web page code. The set-of-rules are stored in association with the web server hosting the web page.

Optionally, the virtual DOM firewall is stored on the web server and executed by the hardware processor of the web server in associated with the web page code.

The monitoring code described herein includes the virtual DOM firewall, and/or sometimes the term monitoring code may be interchanged with the term virtual DOM firewall (or with the terms virtual DOM, and/or firewall).

Optionally, the virtual DOM firewall intercepts messages storing instructions of the attempted actions and/or attempted events for manipulation of the DOM. The virtual DOM firewall allows the intercepted message to continue transmission to the DOM for manipulation of the DOM when no deviation from the set-of-rules is identified. Alternatively or additionally, the virtual DOM firewall blocks the intercepted message from continued transmission to the DOM for manipulation of the DOM when the deviation from the set-of-rules is identified.

Optionally, when the deviation from the set-of-rules is identified, the virtual DOM firewall transmits to the respective component of the web page code, a virtual reply in response to the attempted actions and/or attempted events. The virtual reply includes false data indicative of simulated execution of the attempted actions and/or attempted events on the DOM without executing the at least one of attempted actions and attempted events on the DOM. The virtual reply enables the web page code to continue execution without deviating from the set-of-rules, since the component receiving the virtual reply is led to believe that the attempted actions and/or attempted events were executed on the DOM, when in fact the attempted actions and/or attempted events were not actually executed on the DOM.

The virtual reply is generated according to a simulation of execution of the attempted actions and/or attempted events on the virtual DOM that simulates the DOM without executing the at least one of attempted actions and attempted events on the DOM.

Optionally, the virtual DOM firewall identifies the deviation from the set-of-rules before the DOM is manipulated according to the attempted actions and/or attempted events.

The virtual DOM firewall prevents prohibited the attempted actions and/or attempted events from being performed on the DOM.

Optionally, the virtual DOM firewall identifies the deviation from the set-of-rules while the browser of the client terminal is accessing the web page code stored on the web server. The virtual DOM firewall does not excessively delay access and/or presentation of the web page code on a display of the client terminal.

Some implementations of the systems, methods, apparatus, and/or code instructions described herein relate to the technical problem of protecting the DOM of the web page code stored on a web server from executing impermissible actions and/or events on the DOM. The technical problem may relate to protecting the client terminals of the users accessing the web page code and/or protecting the web page code itself. The technical problem may relate to ensuring correct execution of the original web page code, and/or supervising third party code (e.g., originating from an external third party server) and/or supervising code originating from the client terminal accessing the web page code on the web server (e.g., user scripts, injected code, and/or hijack code). The technical problem may relate to protecting the web page code from malicious software installed on the client terminal that injects user-scripts into the webpage code, and/or third part code attempting to interact with the web page code.

It is noted that some implementations of the systems, methods, apparatus, and/or code instructions described herein may block behavior of components of the web page code that are otherwise classified as normal, non-malicious, and/or allowed, for example, in comparison to anti-malware methods that identify malicious behavior.

Some implementations of the systems, methods, apparatus, and/or code instructions described herein improve computational efficiency of the web server hosting the web page code and executing the virtual DOM firewall. Computational efficiency is improved, for example, in terms of reduced computational time, reduced utilization of processing resources, and/or reduced utilization of data storage devices. Computational efficiency is improved, for example, by the virtual DOM firewall that allows for uninterrupted execution of the web page code (e.g., by the hardware processors the web server and/or when rendered on the client terminal by the web browser) and analyzes actions and/or events targeting the DOM. Computational efficiency is improved, for example, in comparison to other methods such as sandbox based methods that require additional processing and/or memory resources for pre-executing code and/or executing code in controlled environments using dedicated resources.

Some implementations of the systems, methods, apparatus, and/or code instructions described herein improve computational efficiency of the client terminal accessing the web page code. The computational efficiency may be improved by the virtual DOM firewall executing on the web server that intercepts the actions and/or events targeting the DOM in real time, which reduces the delay incurred by the client terminal in rendering and/or presenting the web page code on the display of the client terminal. The computational efficiency may be improved, for example, in comparison to other anti-malware methods that pre-analyze code and/or execute code in a sandbox prior to releasing the code to the client terminal.

An aspect of some embodiments of the present invention relates to systems and/or methods (e.g., implemented by a processor executing code stored in a storage device) that use monitoring-code loaded with a web page to monitor and optionally control web page code received in response to a browser request at a browser rendering the web page. The monitoring-code monitors events and action driven by the component(s) of the web page code, for example in response to a transmission of ad requests to an ad-server. The monitoring and control of the component(s) of the web page code, for instance programmatic ads, is optionally based on a set-of-rules that defines allowable and/or prohibited behavior of component(s) of the web page code. The set-of-rules may represent a whitelist defining allowable behaving and/or a blacklist defining prohibited behavior. The set-of-rules may define undesired parameters that may lead to a degradation of the user experience, for example, a slowdown in the functioning of the browser and/or a slowdown in the computer, which may be due to, for example, increased processor utilization by the component(s) of the web page code. The set-of-rules may define undesired parameters defining a behavior of the component(s) of the web page code that decreases performance of the client terminal and/or lead to a degradation in experience of the visitor to the web page, for example, network traffic created by the component(s) of the web page code, sound and/or video activated by the component(s) of the web page code, and web page space occupied by the component(s) of the web page code. Component(s) of the web page code which are determined to deviate from the set-of-rules may be designated, reported, and/or blocked. The monitoring-code performing real-time monitoring of the component(s) of the web page code may detect real-time deviations from the set-of-rules (e.g., a real-time degradation in user experience of a visitor to the web page according to the undesired parameters) which may not otherwise be possible using non-real time methods, for example, traffic simulations and/or manual auditing. The component(s) of the web page code being monitored may otherwise be granted permission to be loaded by the web browser, based on the assumption that the component(s) of the web page code adheres to (i.e., does not deviate from) the set-of-rules. The real-time monitoring of the component(s) of the web page code may detect when the component(s) of the web page code deviates from the set-of-rules. The real-time monitoring of the components may detect real-time deviations from the set-of-rules due to, for example, operation of advertising bots, previously unknown ads selected by the ad-server, frequency capping, re-targeting, and/or other dynamic advertising methods that may not allow for accurate prediction of the component(s) of the web page code inserted in real-time. Component(s) of the web page code that deviate from the set-of-rules may be selectively filtered (and/or reported), while components that adhered to the set-of-rules are allowed to continue execution.

The monitoring-code may monitor the components within the web page. Alternatively or additionally, each of multiple instances of monitoring-code monitors respective component(s) of the web page code. Each instance of monitoring-code may be loaded within a frame of the web page designated for hosting a certain component(s) of the web page code. Each frame that is loaded by the browser triggers execution of the monitoring-code instance to monitor the component(s) of the web page code loaded within the frame.

Each component may include one or more sub-components which may be provided by the server delivering the component or may be provided by another server. The sub-components may trigger activation of other components in a chain reaction, which may be recursive or iterative. The deviation from the set-of-rules may be caused by activity of one or more components, even when the remaining components adhere to the set-of-rules. Identification and blocking of the problematic sub-component while allowing the remaining sub-components to execute may result in adherence to the set-of-rules by the component. For example, sound (which deviates from the set-of-rules) in a video advertisement may be automatically blocked while the video continues to play (adhering to the set-of-rules). In another example, a component of an advertisement web browser media object is identified as transmitting data at a high rate to a remote server (activity which deviates from the set-of-rules). The network transmitting component may be selectively blocked while allowing the remaining components of the advertisement to continue executing (while adhering to the set-of-rules).

Optionally, the monitoring-code creates a data structure that defines a call chain of sub-components of each web browser media object component, for example, a dependency graph wherein each node represents a respective sub-component of the web browser media object component and edges (optionally directed) represent the calling relationship between the sub-components. Edges may be assigned weights based on one or more parameters, for example, time to execute the component, and/or location within the component(s) of the web page code. The components may be located in one or more remote-servers. The call chain may be hierarchical and/or iterative and/or recursive, in which one component calls one or more other components. When the web browser media object is identified as deviating from the set-of-rules, the call chain may be analyzed to identify the one or more components that are responsible for deviation from the set-of-rules. The certain responsible component may be blocked (and/or reported), while allowing the remaining components to continue executing. The remaining components may be monitored for deviation from the set-of-rules.

Some implementations of the systems and/or methods described herein provide a technical solution to the internet-centric technical problem of monitoring component(s) of the web page code that are received in response to a web browser request at a web browser rendering a web page. The received component(s) of the web page code may degrade performance of the client terminal and/or of the user experience of the user visiting the web page. The received component(s) of the web page code may not be known or predicted in advance by the browser. The systems and/or methods described herein solve an internet-centric problem with a solution necessarily rooted in computer technology, by providing a network-based solution that includes monitoring-code that is loaded with the code of the web page that is rendered by the web browser, and optionally a monitoring server that communicates with the monitoring-code executed by the client terminal.

The systems and/or methods described herein improve performance of computers (e.g., client terminal(s), web server) and/or a network (e.g., connecting the client terminal(s) and web server), by identifying problematic component(s) of the web page code that cause degradation of the performance of the client terminal and/or degradation of the user experience for users visiting the web page hosted by the web server. The component(s) of the web page code may degrade performance, for example, of the client terminal by causing high CPU usage, of the network by increasing network traffic, slow down the client terminal and/or browser, and/or lead to the introduction of malware to the client terminal. Filtering the identified problematic component(s) of the web page code and/or blocking the component(s) of the web page code improves performance.

The systems and/or methods described herein create new data in the form of a dependency graph (or other implementation) that represents links and/or hierarchical relationships between the component(s) of the web page code. The graph may be analyzed to identify which component(s) led to deviation from the set-of-rules.

Accordingly, the systems and/or methods described herein are necessarily rooted in computer technology, in internet-centric environments, and/or in networking technology to overcome an actual technical problem arising in network communication, and/or real-time insertion of component(s) of the web page code in web page being rendered by a browser running on a client terminal.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term code may mean (depending on the context) compiled code, human readable program code, hypertext, a script, and/or other instruction implementations.

The web browser media object(s) may be implemented as an online advertisement that performs actions on the client terminal of a user viewing the ad as part of a web page, for instance, a programmatic ad.

Exemplary actions performed by the web browser media object(s) include, animation, sound, video, pop-up windows, and background data collection. The web browser media object(s) may be accessed remotely using a link, from the web browser of the client terminal accessing the web browser media object(s) located on a remote advertisement server.

As used herein, the term component (i.e., web browser media object(s) component) and resource (i.e., web browser media object(s) resource) and object may sometimes be interchanged, and/or have a common meaning. The term component and/or resource and/or object refer to one or more of:

- The web page code itself, i.e., the normal and/or original programmed web page code.
- External code (e.g., third party code) that is executed within the web page code, for example, web browser media object(s) such as multi media presentations for example, multi media advertisements. The web browser media object(s) may be received from an ad server and/or other third party server.
- Injected code and/or scripts inserted into the web page code. Such code may be injected, for example, by the client terminal accessing the web page code.

It is noted that the web page code may not necessarily incorporate any third party components, and may execute its own code. However, user scripts, and/or other types of hijacking code may be injected into the web page code by the client terminal accessing the web page code.

Exemplary actions performed by the component(s) of the web page code which are analyzed by the virtual DOM firewall include:

- Limiting permissions to certain banking activities to managing banking risk levels, for example, to money transfer features.
- Asking a user to re-identify with a different option.
- Preventing ads from creating pop-ups, and launching video autoplay. Limiting the ads to user initiated video.
- Preventing impermissible access to user details, for example, by an e-commerce site preventing theft of user details of its customers.
- Maintaining privacy of email content and/or login credential of users, for example, by an email account web site.

Controlling presentation of sensitive data, for example, by an insurance web site.

Preventing blockchain and/or coinhive activity on the web site, for example, by an online newspaper controlling third party partners.

As used herein, the term web browser may be interchanged with the term mobile application, the term web page may be interchanged with the term application, and the term web server may be interchanged with the term application server. For example as described herein, the user may use the web browser to access a web page hosted by a web server, or use a mobile application installed on a mobile device to access data on an application hosted by the application server. For clarity, web pages hosted by web servers are described, but it should be understood that the systems and/or methods described herein may be applied to applications hosted by servers accessed by users using mobile applications (e.g., installed on a mobile device).

As used herein, the terms hierarchical, iterative, and recursive may sometimes be interchanged where referring to the relationships between components and/or resources of the monitored component(s) of the web page code, for example, represented within the graph described herein (or other data structure implementation).

As used herein, the terms blocking and filtering are sometimes interchangeable.

As used herein, the terms monitoring (or monitored) and instrumentation (or instrumented) are sometimes interchangeable.

Figure 2:
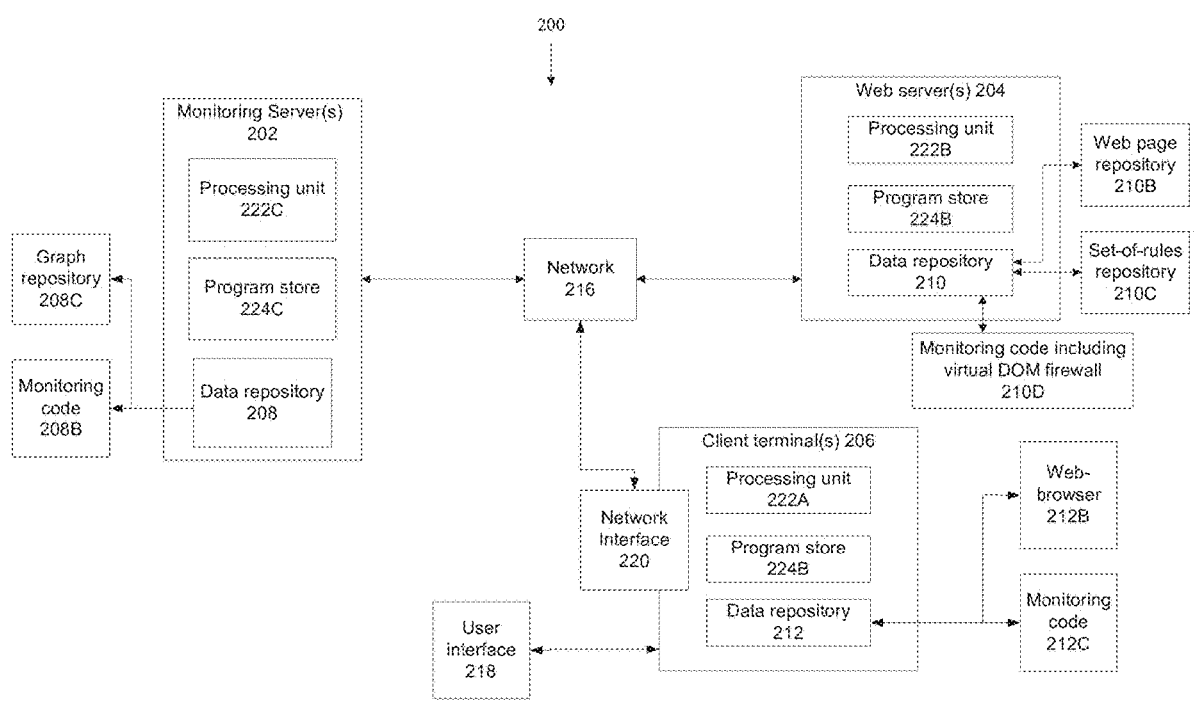
FIG. 2 is a block diagram of components of a system that executes monitoring code located within a web page to monitor behavior of components of the web page code according to a set-of-rules, in accordance with some embodiments of the present invention.

Reference is now made to FIG. 1, which is a flowchart of a method of monitoring activities and/or events driven by component(s) of the web page code received in response to a web browser request at a web browser rendering a web page, in accordance with some embodiments of the present invention. Reference is also made to FIG. 2, which is a block diagram of components of a system 200 that executes monitoring code loaded with web page code received in response to a web browser request at a web browser rendering a web page, in accordance with some embodiments of the present invention. The monitoring code identifies a deviation from a set-of-rules according to an analysis of the monitored activities and/or events driven by the component(s) of the web page code. System 200 may execute the acts of the method described with reference to FIG. 1, for example, by a processor executing code instructions stored in a storage device. System 200 and/or the method of FIG. 1 monitor activities and/or events driven by the component(s) of the web page code in real time according to the set-of-rules, to identify component(s) of the web page code that deviate from the set-of-rules. New activities and/or events of component(s) of the web page code and/or new components, for example, dynamically inserted in real-time into the web page by an ad-server, may be monitored in real-time for deviation from the set-of-rules. The deviating component(s) of the web page code may be blocked (e.g., in real-time), filtered, and/or reported (e.g., to a server).

System 200 may include a monitoring server 202 that provides monitoring code 208B (stored in a date repository 208) that is inserted into a web page (e.g., stored in a web page repository 210B of data repository 210 of a hosting web server 204). Alternatively, monitoring code 210D, which includes the virtual DOM firewall, is pre-installed on web server 204.

When monitoring code 210D and set-of-rules 210C are stored by web server 204 (and/or defined via web server 204), web page code (stored in web site repository 210B is protected by monitoring code and virtual DOM firewall 210D. No additional installation of code is necessarily required on client terminal(s) 206 accessing web page code hosted by web server 204. No prior action is necessarily required from users using client terminal(s) 206 to access web page code hosted by web server 204.

Monitoring code 208B may be directly inserted into the web page (e.g., as one or more code instances each associated with a designated location for insertion of component(s) of the web page code), and/or accessed remotely using a link and/or software interface for example, as described with reference to block 102. Server 202 may store a graph (or other data representation) for each component(s) of the web page code that represents links and/or a hierarchical relationship between component(s) of the web page code. Graphs may be stored in graph-repository 208C stored in data repository 208 of monitoring server 202.

System 200 includes one or more client terminals 206 that communicate with web server 204 over network 216. Web servers 204 store web page code in a web page repository 210B. Exemplary web page code stored by a corresponding web server 204 include: e-commerce web site, bank web site, and insurance portal.

A web browser 212B (e.g., stored in data repository 212 of client terminal 206) may access the web page hosted by web server 204, and render the web page for presentation on user interface 218 of client terminal 206. Monitoring code 210D inserted within the web page may be executed by web-server 204 to monitor actions of the code of the web page. Monitoring code inserted within web page may be executed by web browser 212B and optionally locally stored as monitoring code 212C in data repository 212 of client terminal 206. Monitoring code may be loaded with component(s) of the web page code dynamically inserted into the web page by server 214 to monitoring the activities and/or events driven by the component(s) of the web page code using a set-of-rules. The set-of-rules may be stored, for example, in set-of-rules repository 210C of data repository 210 of web server 204, locally stored in data repository 212 of client terminal 206, and/or inserted within the web page.

Client terminal 206 may include a network interface 220 for connecting to network 216, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Monitoring server 202 may communicate with client terminal 206 over network, for example, receiving transmissions of the activities and/or events driven by the component(s) of the web page code and/or links between components for analysis, and/or creation and/or updating of the graph stored in graph repository 208C.

Client terminals 206 may be implemented as, for example, a mobile device, a desktop computer, a thin client, a Smartphone, a Tablet computer, a laptop computer, a server, a wearable computer, glasses computer, and a watch computer. Exemplary user interfaces 218 include, for example one or more of, a touchscreen, a display, a keyboard, a mouse, and voice activated software using speakers and microphone.

Exemplary network 216 includes the internet, a private network, a local area network, and/or a cellular network, and a wireless network.

Each of client terminal 206, and web server 204, and monitoring server 202 include a respective processing unit 222A-C, a program store 224A-C storing code instructions for execution by the respective processing unit, and optionally a data repository 212, 210, and 208 that stores data.

Processing units 222A-C may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processing unit(s) 222A-C may include one or more processors (homogenous or heterogeneous), which may be arranged for parallel processing, as clusters and/or as one or more multi core processing units.

Program stores 224A-C store code instructions implementable by respective processing units 222A-C, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Data repositories 212, 210, and 208 may be implemented as, for example, a memory, a local hard-drive, a removable storage unit, an optical disk, a storage device, and/or as a remote server and/or computing cloud (e.g., accessed using a network connection).

At 102, monitoring code is installed in association with web pages. The monitoring code may be included in the code of each web page, for example, as a link, as a script, as hypertext, as compiled code, and/or as human readable program code. The monitoring code may be manually entered by a programmer, and/or automatically inserted by code (e.g., in proximity to designated component(s) of the web page code spots). The monitoring code may be inserted, for example, as a link to a remote server storing the monitoring code (e.g., monitoring server 202), as an interface to monitoring code which may be stored on monitoring server 202, on web server 204, and/or locally by client terminal 206 (e.g., application programming interface (API), software development kit (SDK), a function library, or other software interfaces), and/or as the actual code performing the monitoring.

Optionally, the monitoring code is stored on the web server hosting the web page code, and executed by the processor(s) of the web server.

Optionally, multiple instances of monitoring code are inserted into the web page, optionally each instance is inserted in association with a designated location (e.g., space within the web page, such as within a frame) for a component(s) of the web page code. Each monitoring code instance may be designed to monitor the associated component(s) of the web page code. Alternatively or additionally, a single instance of monitoring code is inserted into the web page for monitoring all component(s) of the web page code instances.

Optionally, each monitoring code instance monitors the activities and/or events driven by the respective component(s) of the web page code without monitoring other content of the web page and/or other web browser media objects being monitored by other monitoring code instances. Each monitoring code may monitor a single component of the web page code, or a group of component(s) of the web page code associated with the same designated location.

The monitoring code may be located in proximity to the components and/or to the designated location for receiving the components.

As used herein, the term proximity may mean physical proximity, for example, the monitoring code may be located a certain number of characters and/or certain number of lines away from the component(s) of the web page code in the code of the web page. Alternatively or additionally, the term proximity may mean logical proximity and/or logically linked, where the monitoring code and the component(s) of the web page code are loaded and executed (e.g., by the browser and/or executed by the processor) together, in parallel and/or sequentially, and/or close in time to one another, for example, the monitoring code and the component(s) of the web page code are located within a common frame that is loaded and executed.

Monitoring code 208B may be stored in data repository 208 of monitoring server 202, for remote access (e.g., using a link and/or an interface), and/or for download-to web server 204 and/or client terminal 206. As described herein, the functions performed by the monitoring code may be performed entirely by one device, or performed by multiple devices (e.g., based on transmission of data between devices). For example, local monitoring may be performed by client terminal 206, analysis of the monitored data may be performed by monitoring server 202, and verification and/or block may be performed by web server 204.

Optionally, a set-of-rules is defined manually by a user, automatically created by code (e.g., based on an analysis of performance of web server 204 and/or client terminal 206), and/or based on predefined configurations. Set-of-rules may be stored as code, as a script, as a text file, as database entries, as values for predefined parameters, and/or other implementations. The defined set-of-rules may be stored in a set-of-rules repository 210C stored in data repository 210 of web server 204. Alternatively or additionally, the set-of-rules may be created and/or stored by client terminal 205, and/or monitoring server 202. Alternatively or additionally, the set-of-rules may be included within the code of the web page, for example, as code inserted into the web page code, and/or as a link to an external server hosting the set-of-rules.

The set-of-rules may define allowable and/or prohibited actions of the components of the web page code in modifying the DOM of the web page code.

The set-of-rules may define undesired parameters representing an allowable and/or prohibited degradation to the user experience of a user using web browser 212B (stored by data repository 212 of client terminal 206) to access the web page hosted by web server 204. The set-of-rules is based on the degradation due to the component(s) of the web page code which is inserted into the web page when accessed by the user using web browser 212B. The component(s) of the web page code may drive activities and/or events that degrade the user experience of the visitor to the web site and/or degrade the performance of the mobile application used by the user, for example activities and/or events that, hog network resources (e.g., wireless bandwidth), elevate central processing unit (CPU) utilization, slow down loading of the web page, slow down performance of client terminal 206, slow down execution of other applications running on client terminal 206, generate sound (e.g., loud, uncontrollable sound), and/or introduce malware to client terminal 206.

The set-of-rules may define which element types are allowed or not allowed to be created on the web page rendered according to the web page code. For example, not to allow one or more of the following element types if the respective element type is not relevant to the web page: flash object, cross domain iframes, blobs, video elements and the like.

The set-of-rules may defined, for a respective approved DOM element type, the allowed attributes of the web page, for example, allowed iframe sources and permitted attributes such as size, allowed scripts, allowed image elements and permitted attributes such as size, and ajax and cors origin locations.

The component(s) of the web page code may be transmitted by server 214 (or another server) in response to a browser request at a browser rendering the web page. The component(s) of the web page code may be loaded dynamically in real time when web browser 212B is rendering the web page stored on web server 204. Component(s) of the web page code may be a programmatic ad selected in real-time. The actual provided component(s) of the web page code may not be known until the component(s) of the web page code is already loaded with the accessed web page by web browser 212.

Optionally, the set-of-rules define allocation of resources and/or allowed and/or prohibited activities and/or events driven by the component(s) of the web page code. The set-of-rules may define allocation of resources and/or allowed and/or prohibited activities and/or events for each component(s) of the web page code, for a group of components, and/or globally for all the components simultaneously executing on the loaded web page.

Exemplary set-of-rules include one or more of: network usage by the component(s) of the web page code causing a statistically significant reduction in network performance, processing resource utilization by the component(s) of the web page code causing a statistically significant reduction in performance of the client terminal, statistically significant user noticeable slow-down in loading of the web page, statistically significant user noticeable slowdown in execution of other applications running on the client terminal, and detection of malware. The statistically significant level may be defined by the user and/or by the host of the web page, for example, as user noticeable and/or user tolerable reduction in performance. Some reduction in performance may be allowable. The set-of-rules define how much reduction of performance is tolerated.

The set-of-rules may define the size of the designated component(s) of the web page code, for example, what percentage of the screen the component(s) of the web page code is allowed to use, and/or the location of the component(s) of the web page code. Optionally, the component(s) of the web page code are designated for execution within a frame (e.g., a hypertext markup language (HTML) iframe) having a size and/or shape defined by the set-of-rules Optionally, the set-of-rules is designed to detect undesired activity, for example, component(s) of the web page code associated with an advertiser bot. Alternatively or additionally, the set-of-rules is designed to control activities and/or events driven by component(s) of the web page code which may not necessarily be predicted (e.g., by traffic simulator and/or manual auditing) since the true activities and/or events driven by the component(s) of the web page code may not be known until the component(s) of the web page code is actually loaded. For example, the set-of rules may be designed to control activities and/or events driven by component(s) of the web page code selected based on a frequency capping method and/or re-targeting method.

At 104, data for rendering of a web page by web browser 212 is transmitted from web server 204 to client terminal 206 over network 216. The web page includes designation(s) for placement of component(s) of the web page code, and monitoring code instruction instances. Optionally each monitoring code instance is located in proximity to respective designations for placement of respective component(s) of the web page code.

At 106, the web page is locally rendered and presented by web browser 212B on a display (e.g., user interface 218) of client terminal 206.

Each monitoring code instance and associated component(s) of the web page code may be loaded together (e.g., simultaneously, in parallel, and/or sequentially), optionally by browser 212B. The loading of the monitoring code and component(s) of the web page code may be performed per respective frame of the web page. The executing monitoring code instance monitors activity and/or events driven by the associated component(s) of the web page code within the respective frame. The loaded monitoring code 212C may be locally stored in data repository 212 of client terminal 206.

Optionally, server 214 provides the component(s) of the web page code for each designated location of the web page dynamically during the loading. The component(s) of the web page code are received in response to a browser request at a browser rendering the web-page. The provided component(s) of the web page code may include one or more links to resources (e.g., additional component(s) of the web page code instructions), which may be located on server 214 and/or on another remote server, for example, a server of the business entity associated with the component(s) of the web page code and/or a server of a data collection and/or advertising agency associated with the component(s) of the web page code. The additional linked resources may include instructions for execution by browser 212B of client terminal 206, which may degrade the user experience and/or degrade performance of client terminal 206, as described herein. The component(s) of the web page code resources may be arranged in a hierarchy, where one component(s) of the web page code includes instructions to execute one or more other component(s) of the web page code, for example, by linking to other component(s) of the web page code located on the same or another remote server. The hierarchical component(s) of the web page code may trigger a chain of activity, which may be exponential in nature, which may severely degrade performance of client terminal 206.

At 108, each monitoring code instance monitors the activities and/or events driven by the respective component(s) of the web page code, which may be located in proximity to the respective monitoring code instance.

The monitoring code monitors attempted actions and/or attempted events initiated by the components of the web page code. The attempted actions and/or attempted events include instructions for manipulation of the DOM of the web page code. The virtual DOM firewall simulates the DOM, and intercepts messages storing instructions for execution of the attempted actions and/or attempted events targeting the DOM without execution of the attempted actions and/or attempted events on the DOM.

Optionally, the monitoring is performed to identify the activities and/or events driven by each component(s) of the web page code (e.g., when the component(s) of the web page code is organized as hierarchical and/or includes links to other remotely located component(s) of the web page code). The certain component of the web page code that caused the deviation from the set-of-rules may be identified. The certain problematic component may be blocked, rather than the entire web page code, which may allow the ad to be presented to the user without necessarily degrading the user experience and/or performance of client terminal 206.

The monitoring code may monitor one or more parameters before and/or after loading of the component(s) of the web page code. The monitoring code may monitor one or more parameters of client terminal 206 based on the set-ofrules associated with the respective web page and/or the set-of-rules associated with the respective component(s) of the web page code. For example, the monitoring code may monitor CPU usage of client terminal 206, network bandwidth available to client terminal 206 (e.g., wireless and/or wired), available memory on client terminal 206, delay between detected user actions (e.g., mouse click) and response (e.g., changes on the display), activation of sound, and detection of malware (e.g., which may be performed by a third party malware detection application that communicates with the monitoring code).

As used herein, the term mutation event is not necessarily intended to be limited to a certain implementation. For example, the term mutation event may be interchanged with the term Mutation Observer, and/or may mean other mutation listener implementations and/or any other mechanism to detect DOM and/or web page and/or user interface changes.

The monitoring code may monitor the document object model (DOM) of the web page to detect changes to the DOM. Alternatively or additionally, the monitoring code may monitor the virtual DOM firewall that simulates the DOM of the web page to detect changes to the virtual DOM. Monitoring code may monitor the DOM (and/or virtual DOM firewall) to detect mutation events, for example, by adding an event handler that detect the mutation event to the DOM (and/or virtual DOM firewall) of the web page. When monitoring code detects the mutation event indicating a change to the DOM (and/or virtual DOM firewall), the monitoring code may determine which component(s) of the web page code caused the mutation event, optionally by analyzing a stack trace of client terminal 206. The code identified by the stack trace as being associated with the mutation event may be traced to the component(s) of the web page code that caused the mutation. The certain component (e.g., web browser media object(s)) that caused the mutation event may be identified based on the stack trace. Alternatively or additionally, the mutation is analyzed to identify whether the mutation deviates from the set-of-rules.

The monitoring code may monitor network activity over network 216 (e.g., transmitted via network interface 220) which may be associated with the component(s) of the web page code, for example, to detect an increase in network activity, and/or detect packets associated with the component(s) of the web page code (e.g., origin and/or destination addresses). Monitoring of network activity may be performed by issuing queries to a third party network monitoring application and/or device to report current network activity. Monitoring of network activity may be performed by timing recently opened interfaces (e.g., APIs) that were opened by web browser 212B.

The monitoring code may monitor for undesired sound and/or video generated by the component(s) of the web page code, for example, by binding to change events indicative of audio and/or video elements of the web page.

The monitoring code may perform recursive monitoring during loading of sub-frame(s) within a loaded parent frame of the web page. The recursive monitoring is performed by monitoring the activities and/or events driven by the component(s) of the web page code within the loaded sub-frame and/or parent frame, optionally by monitoring the activities and/or events driven by the component of the web page code that is executing within the sub-frame(s). The monitoring code may recursively bind itself to the current parent frame, and/or the detected sub-frame. The component(s) of the web page code may perform recursive monitoring, for example, by identifying changes to the DOM (e.g., mutation events), network activity, and/or other monitoring methods described herein.

Optionally, the monitoring code monitors activities and/or events driven by the component(s) of the web page code based on one or more technological platform implementation of the component(s) of the web page code. The monitoring code may monitor different aspects of the technological implementation, for example, the activities and/or events achieved using programming language(s) used to create the component(s) of the web page code (e.g., player based languages, vector, animation, hypertext), DOM representation of the component(s) of the web page code, software interface used by the component(s) of the web page code (e.g., API, SDK), and network activity due to the component(s) of the web page code.

Optionally, the monitoring is performed by creating a call chain of sub-components of each component(s) of the web page code. The call chain may be created by analyzing call stacks to identify the connectivity between the sub-components of the component(s) of the web page code.

Optionally, the monitoring is performed using instrumentation code. For example, when using JAVASCRIPT™, the XMLHttpRequest object and/or the browser Fetch API object and/or associated objects may be overridden to analyze the call stack within the JAVASCRIPT™ and/or AJAX network request call to obtain the component that originated the request (i.e., attempted action and/or event on the DOM). Optionally, the business entity associated with each component(s) of the web page code may be identified, for example, by mapping the component(s) of the web page code to the business entity by following the link to the component(s) of the web page code to identify the server hosting the component(s) of the web page code.

In another example of instrumentation code, the call chain may be constructed from the stack, for example, by defining a function (e.g., getCallingScript( )) that when invoked obtains the current stack trace. An exemplary implementation of such a function throws and immediately catches an error. An ordinal list of component(s) of the web page code (e.g., script) sources may be extracted from the stack trace. The first component(s) of the web page code is the code (e.g., script) that invoked the function (e.g., getCallingScript( )) and is discarded. The remaining code represents the calling chain.

The instrumentation constructor function implementation (e.g., of AJAX) may be used to control the rate of network requests.

Optionally, the monitoring tracks loading of each component(s) of the web page code. The loading data is used to build a dependency graph representing dependency between sub-components of each component(s) of the web page code. Each node of the graph may represent a component(s) of the web page code. Edges between nodes represent dependencies. The dependencies may be obtained from the identified call chain. Additional data may be collected in association with each tracked loading event. The additional data may include time of loading relative to the start of the loading process of the web page, and/or the location of the component(s) of the web page code in the web page relative to the root of the web page. The additional data may be represented within the created dependency graph as weights (e.g., absolute or relative) assigned between nodes of the graph. The weights may represent the loading time and/or distance based on the location, and/or other data. The location and/or distance may be defined according to the distance between nodes, for example, in a graph (e.g., directed acyclic) representation of the DOM the distance may be the number of edges in a shortest path. The location and/or distance may be defined as the distance on the display between two points (e.g., which may be calculated as a line between the two points according to geometrical coordinates on the screen, which may represent the actual physical distance in terms of centimeters, pixels, or other measurements). A single weight may be used (e.g., function based on time and distance), and/or weights may be used for each type of data (e.g., one weight for time, and another weight for distance).

Optionally, the loading relationships of resources of the web page, and optionally the time of loading and/or the location of the resource may be collected by monitoring code 212C during the session (i.e., while the web page is presented by web browser 212). Upon terminal of the session (e.g., closing of the web page and/or closing of web browser 212) and/or at one or more points throughout the session, the collected data may be added to a common graph created for the component(s) of the web page code and/or representing an average of weights based on multiple sessions (i.e., multiple events of users viewing the component(s) of the web page code on the same or different web pages). The collected data may be transmitted from client terminal 206 to monitoring server 202, which may store common graphs for each component of the web page code in a graph repository 208C (e.g. stored in data repository 208). Graph repository 208C may be implemented, for example, as a database storing a representation of each graph. The common graph for the component(s) of the web page code may be updated with new nodes and/or new edges between nodes based on the monitored data (e.g., different sessions may activate different component(s) of the web page code). The weights may be updated based on the new measurements obtained during each session. The common graph represents an average weighted graph of sub-components for each component(s) of the web page code.

Optionally, a machine learning method is applied to the common graph to identify component(s) of the web page code deviating from the set-of-rules. Optionally, a cluster analysis method is applied to the graph to identify clusters representing dependent component(s) of the web page code. The machine learning method may be stored as code in data repository 208 of monitoring server 202.

One or more of the monitoring functions may be performed remotely by monitoring server 202 and/or web server 204 based on data transmitted over network 216 by client terminal 206. For example, monitoring code 212C stored in data repository 212 of client terminal 206 may collect monitoring data, and transmit the collected monitoring data to monitoring server 202 for aggregation and/or monitoring analysis.

Optionally, each instance of monitoring code monitors respective component(s) of the web page code using the same or similar set-of-rules, for example, each instance of monitoring code monitors whether inappropriate sound is generated by the component(s) of the web page code. Alternatively or additionally, each instance of monitoring code is customized to monitor component(s) of the web page code using a different set-of-rules, for example, each component(s) of the web page code is monitored for the size it takes up on the web page according to the designated location and size allocated for the respective component(s) of the web page code.

Reference is now made to FIG. 4, which is an example of monitoring code (written in FLASH™) that detects recursive loading of FLASH™ components of the component(s) of the web page code, in accordance with some embodiments of the present invention. Other technological platforms may be monitored independently, and/or in association with the FLASH™ components.

Reference is now made to FIG. 5, which is an example of pseudo-code for creating an instrumentation constructor function implementation that monitors the stack trace, in accordance with some embodiments of the present invention.

Referring now back to FIG. 1, at 110, a deviation from the set-of-rules is identified according to an analysis of the monitored activities and/or events of each component(s) of the web page code. The deviation may identified per component(s) of the web page code using the set-of-rules that define allowable behavior of the respective component(s) of the web page code, for example, each component(s) of the web page code is analyzed to determine whether sound is generated by the respective component(s) of the web page code. The deviation may be a global deviation based on a set-of-rules that define global behavior of multiple (e.g., all) component(s) of the web page code. For example, the network activity created by individual component(s) of the web page code may adhere to the set-of-rules, however the combined network activity generated by all the component(s) of the web page code loaded with the web-page may deviate from the set-of-rules.

Optionally, a common set-of-rules is defined for the web page code for execution by the web server when multiple client terminals access the web page code. The set-of-rules are stored in association with the web server hosting the web page.

Optionally, the virtual DOM firewall identifies the deviation from the set-of-rules before the DOM is manipulated according to the attempted actions and/or attempted events. Alternatively or additionally, the virtual DOM firewall identifies the deviation from the set-of-rules while the browser of the client terminal is accessing the web page code stored on the web server.

The deviation from the set-of-rules may be a prediction, when the activities and/or events of the component(s) of the web page code have not yet occurred. For example, the analysis is performed to predict the outcome when the activities and/or events are allowed to occur, without actually executing the activities and/or events. For example, the prediction may be performed by executing the activities and/or events on the virtual DOM, rather than on the actual DOM used in operation. Alternatively, the deviation is determined based on the executed activities and/or events, for example, when the activities and/or events have already occurred, and/or dynamically as the activities and/or events are occurring.

Each component(s) of the web page code may be independently analyzed for identification of the deviation based on the monitoring performed by the associated monitoring code instance. Each sub-component of each component(s) of the web page code may be independent analyzed for identification of deviation based on the monitoring performed by the associated monitoring code instance. For example, when a certain component(s) of the web page code is determined to have deviated from the set-of-rules, an analysis may be performed to determine which sub-component(s) caused the deviation.

Optionally, the size of the respective frame used by the component(s) of the web page code is verified to be according to the designated size defined by the set-of-rules. Other activities and/or events aspects defined by the set-of-rules may be independently verified, for example, CPU usage, performance degradation, network activity, and malware introduction.

The analysis and/or identification of the deviation may be performed locally by client terminal 206 (e.g., using the locally installed monitoring code 212C and/or other code such as analysis code), and/or remotely by monitoring server 202 and/or web server 204 based on data transmitted over network 216 by client terminal 206. For example, monitoring code 212C stored in data repository 212 of client terminal 206 may collect monitoring data, and transmit the collected monitoring data to monitoring server 202 for analysis.

At 112, when a certain component(s) of the web page code is identified as having deviated from the set-of-rules, the certain component(s) of the web page code may be blocked and/or filtered. Filtering may be performed at the web page code level (i.e., blocking the entire web page code), at the component level, and/or blocking access to the remotely located components. Alternatively or additionally, the certain component(s) of the web page code are provided with a predefined virtual response (e.g., message) representing false data that is different than a response with real data. The virtual response allows the component(s) of the web page code to continue operating, without deviating from the set-of-rules, optionally while thinking that the action (which would have deviated from the set-of-rules) has occurred. For example, a web browser media object that plays a video with sound and then queries the sound to make sure the sound is playing may be provided with a response that sound is playing, when in fact sound is off (to avoid violating the set-of-rules that prohibit sound).

Attempted actions and/or attempted events that deviate from the set-of-rules are prevented from execution on the DOM. Attempted actions and/or attempted events that adhere to the set-of-rules are allowed to continue execution on the DOM.

The blocking may be performed locally at client terminal 206, and/or by web server 204 (which may block the present component(s) of the web page code on the client terminal that detected the deviation and from other client terminals and future instances of the component(s) of the web page code from appearing at other the client terminal). The component(s) of the web page code that deviated from the set-of-rules may be added to a black list for future blocking. The blocking may be performed by automatically removing the designation within the web page associated with the component(s) of the web page code identified as deviating from the set-of-rules.

The blocking may be performed in real-time, upon detection of deviation from the set-of-rules. The real-time blocking may recover the degradation. The real-time blocking may be performed quickly enough, before the user is able to detect the performance degradation.

When the problematic component is identified, the component may be blocked and/or removed, for example, from the DOM, from the HTML, from the FLASH™ code, from the SDK accessing the native component.

Blocking may be performed at the network level, for example, at a router or other network computing device.

Alternatively, component(s) of the web page code determined to have not deviated from the set-of-rules (e.g., upon termination of the web page) may be added to a white list.

At 114, a report may be automatically generated (e.g., by code stored in data repository 208 of monitoring server 202). The report may include a statistical analysis of the monitoring of each component(s) of the web page code, an analysis of the analysis results, a report of the identified deviation from the set-of-rules, and/or a report of the blocking. The report may include the calling chain that lead up to the problematic component that deviated from the set-of-rules.

The report may be provided to server 214 to help determine the problematic component(s) of the web page code. The report may be used to isolate the cause of the problematic occurrence, and/or provide meaningful business intelligence of the advertiser or advertising agency that created the problematic component(s) of the web page code.

Optionally, the monitoring related data that is transmitted over network 216 as part of the process described with reference to FIG. 1 (e.g., transmitted between client terminal 206, monitoring server 202, and/or web server 204) is reduced, using one or more of the following exemplary methods:

- A web beacon (e.g., sendBeacon API used by web browser 212B) may be used to send a final payload of monitoring data (e.g., to monitoring server 202) when the user is about to end the session where monitoring code is running (e.g., the DOM unload event). Since we browsers may limit the size of the payload sent by the web beacon, the monitoring code (or other code) transmitting the monitoring data tracks and predicts the size of the next payload. A beacon is transmitted with monitoring data when sending using sendBeacon may fail due to size of the payload. The number of transmitted web beacons may be selected to reduce the overall required amount.
- Using web sockets to compress data transmitted from client terminal 206 to monitoring server 202.
- Filtering the collected monitored data and/or customizing the collection of the monitoring data. For example, the sampling rate of the monitored data may be varied depending on the estimated significance of the monitoring data, for example, critical network related data may be sampled at a higher rate relative to network data with low priority.

Figure 3:
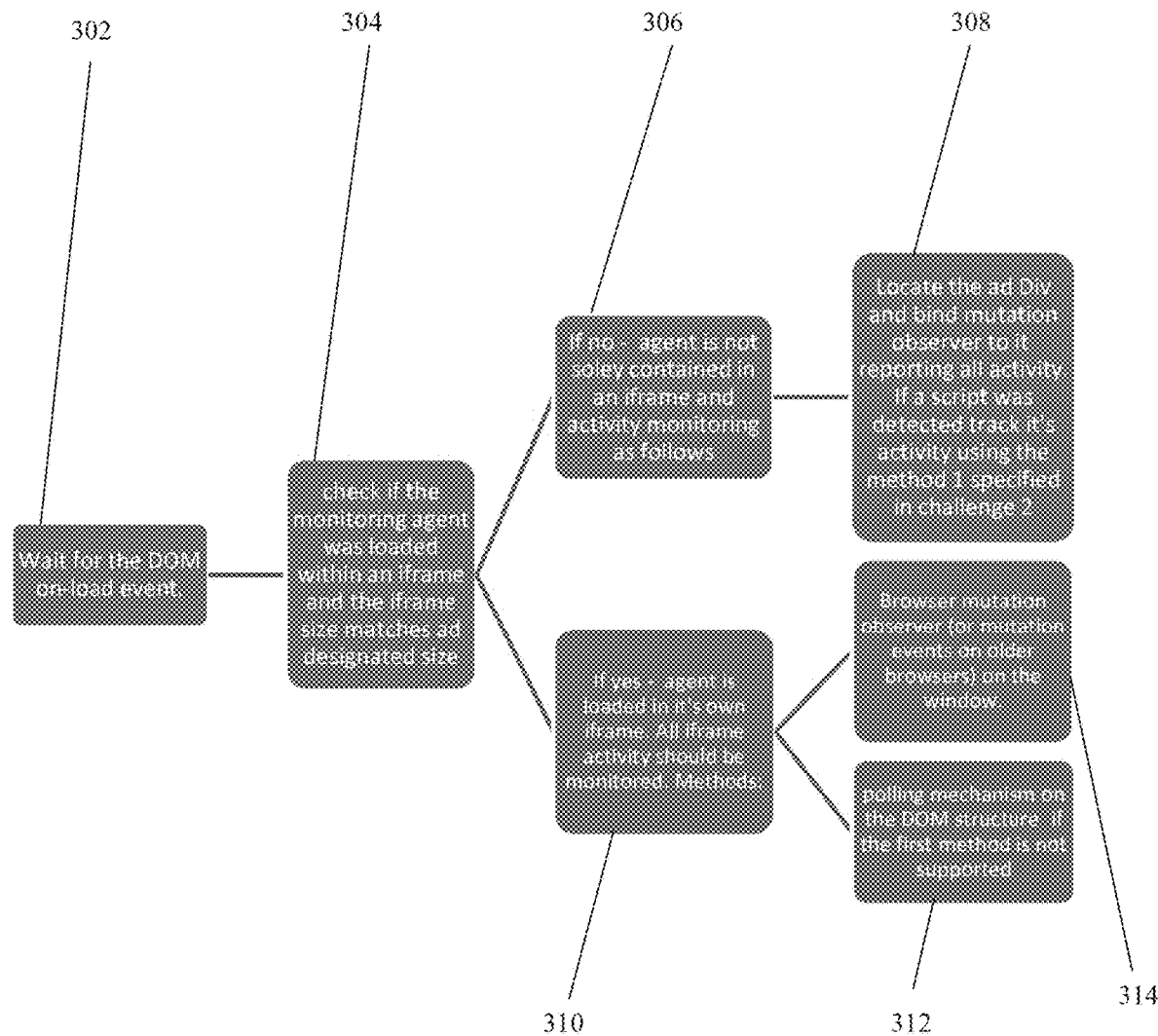
FIG. 3 is a flow chart of an exemplary method implementing the monitoring of the behavior of components of web page code, in accordance with some embodiments of the present invention.

Reference is now made to FIG. 3, which is a flow chart of an exemplary method implementing the monitoring of the activities and/or events driven by component(s) of the web page code inserted in a web page, in accordance with some embodiments of the present invention. The method described with reference to FIG. 3 is an exemplary implementation based on the method of FIG. 1, and may be executed by system 200 described with reference to FIG. 2.

At 302, the DOM on-load event of the web page is detected, for example, by web browser 212B, and/or by other code instruction stored in data repository 212.

At 304, the monitoring code is loaded, optionally by web browser 212B. An analysis is conducted to determine whether the monitoring code is loaded within a location designated for insertion of component(s) of the web page code, for example, a window, an iframe, or other implementation. When the component(s) of the web page code is inserted into the designated location, the monitoring code verifies that the component(s) of the web page code adheres to the set-of-rules defined for the iframe, for example, the size of the component(s) of the web page code is according to the set-of-rules defining the allowed component(s) of the web page code size for the iframe.

Instances of monitoring code may be loaded for each iframe designated to include component(s) of the web page code.

At 306, the analysis determines that the monitoring code instance is not contained within the iframe.

At 308, the monitoring code monitors the component(s) of the web page code by locate the component(s) of the web page code within the web page (e.g., identifying the HTML div element used to define the component(s) of the web page code and/or the location designated to receive component(s) of the web page code). An event mutation observer code (which monitors for changes in the DOM) is bound to the div element. Activity of components of the web page code may be tracked by analyzing the stack trace, as described herein.

Alternatively, at 310, the analysis determines that the monitoring code is loaded in a designated location (optionally iframe or another window representation) for insertion of component(s) of the web page code by the server. The monitoring code monitors activity within the iframe.

At 312, the monitoring code monitors for mutations occurring within the iframe, for example, using a browser mutation observer feature to monitor for changes occurring with a window. The monitoring is based on the assumption that activity occurring within the iframe is related to the component(s) of the web page code inserted within the iframe.

Alternatively or additionally, at 314, the monitoring code monitors the iframe by a polling mechanism on the DOM structure.

Figure 6:
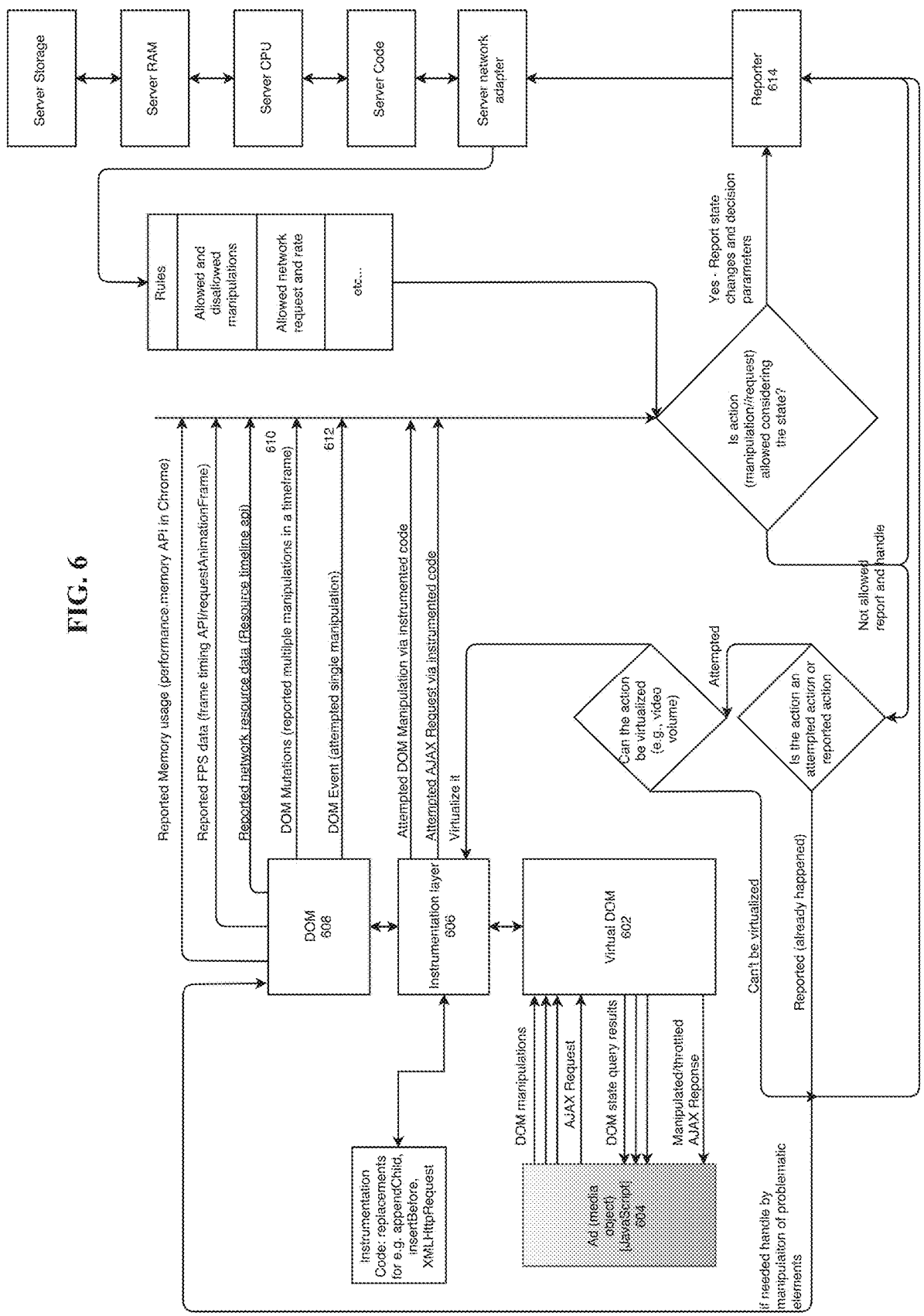
FIG. 6 is an exemplary dataflow implementation based on the method described with reference to FIG. 1, and/or executed using the system described with reference to FIG. 2, in accordance with some embodiments of the present invention.

Reference is now made to FIG. 6, which is an exemplary dataflow implementation based on the method described with reference to FIG. 1, and/or executed using system 200 described with reference to FIG. 2, in accordance with some embodiments of the present invention. The dataflow diagram depicts a virtual DOM 602 (e.g., stored as code instructions executable by processor(s)) that communicates with a component(s) of the web page code 604 (as described herein), optionally as a proxy and/or a filter to the actual DOM 608 (i.e., used to control the web document). Conceptually, virtual DOM 602 acts as a firewall to DOM 608, by selectively allowing or preventing actions on the DOM 608 initiated by web browser media object 604. Virtual DOM firewall 602 may communicate with an instrumentation layer 606 (e.g., corresponding to the monitoring code described herein), which performs the monitoring, analysis, and/or implements decisions. Instrumentation layer 606 may decide to allow messages (e.g., instructions, queries) to continue to actual DOM 608, block the messages, and/or instruct virtual DOM firewall 602 to provided simulates responses back to component(s) of the web page code 604.

Component(s) of the web page code 604 may be proxied and/or instrumented, optionally by the monitoring code. The executed code based on component(s) of the web page code 604 may be modified by replacement, for example, replacing built in symbols (e.g., functions and/or object members in the ad browsing context) with functions that may act as a proxy and/or intercept actions (e.g., read, write, query) on the symbol with customized code. Such instrumentation of the component(s) of the web page code 604 may be obtained by injecting functions (e.g., code elements) and/or properties that replace the functions and/or properties of the component(s) of the web page code 604. For example, the same symbol and/or function name and/or method name may be used such that the corresponding instrumented code is executed rather than the code of the component(s) of the web page code 604. The function and/or property may be, for example, a member of a class and/or prototype object, that when replaced causes all instances of the class and/or prototype object to use the instrumented member instead.

Actions (e.g., instructions, messages, queries, read operations, write operations) executed by component(s) of the web page code 604 on DOM 608 are intercepted by virtual DOM firewall 602 and/or instrumentation layer 606. For example, manipulations and/or queries about the state of DOM 608, for example, loading external resources vial relevant HTML elements (e.g., <image>, <script>, <object>) and AJAX network requests.

Instrumentation layer 606 (e.g., corresponding to the monitoring code described herein) may pass the action along to DOM 608, block the actions, or respond using virtual DOM 602 to the actions using custom responses (i.e., rather than letting DOM 608 respond with the true answer). Instrumentation layer 606 operates according to the set-of-rules, to help make sure that the actions performed by component(s) of the web page code 604 are according to the actions allows by the set-of-rules, and/or by prohibiting actions not allowed according to the set-of-rules.

In some cases, actions are not detected by instrumentation layer 606. In such cases, a DOM MutationObserver process 610 (e.g., code executable by a processor(s)) may be invoked, for example, by the API of the browser, for example, at predefined time intervals, to handle batched manipulation reports.

Actions issued by the component(s) of the web page code 604 may be termed an attempted action when such an action may be intercepted and blocked, filtered, or responded to with false information. Actions that have already occurred (e.g., detected post occurrence) or were unsuccessfully stopped may be termed a reported action (i.e., due to reporting after the fact).

The behavior of actions is detected, reported, and/or identified (e.g., attempts at state changes of DOM 608), and compared against the set-of-rules that defined allowed and/or prohibited actions (e.g., changes and/or states). When an attempted action is detected as being in violation of the set-of-rules, the attempted action is blocked (e.g., prevented from execution by not allowing the action to pass to DOM 608), and/or virtual DOM 602 may provide a reply (i.e., instead of DOM 608) that conforms to the set-of-rules. For example, an ad may play a video with sound, and then issues a query to check that the sound is playing. When the set-of-rules prohibit sound, the sound command might be blocked, and the ad might be provided with a response to the query by the virtual DOM 602 that the sound is playing (when in fact the sound is blocked) to allow the ad to continue running otherwise.

When a reported action is detected (i.e., the action already occurred), code (e.g., monitoring code, or other code) may remove the code elements that caused the problematic behavior, and/or remove the component(s) of the web page code 604 itself.

To determine the behavior of an action(s) issued by the component(s) of the web page code 604, additional information about the state of the computing environment executing the component(s) of the web page code 604 may be collected. The collected information may be analyzed to better gauge user experience and the allowed behavior of component(s) of the web page code 604 as a function of the collected data. Exemplary collected data includes, for example, the current frame rate, information about memory usage, information about network resources being loaded by the component(s) of the web page code 604 (e.g., resource URL, load start time, and time to fully load the resource) may be used to determined, for example, the network load, network latency, and other network performance parameters.

The monitoring code may use the instrumentation data to determine the relationship(s) between internal entities and/ or components of the web page code 604, for example, the component(s) of the web page code 604 may load third party objects that further load other objects. The monitoring code may track and/or analyze the load chain (e.g., using stack traces) to determine which component is responsible for which function call(s). Identifying the load chain may be used to block the behavior of the loading of the third party components, for example, by preventing loading of the first component in the chain.

Details of the dataflow (e.g., state changes, attempted changes, actions, resulting counter actions) may be collected and reported, for example, using a reporter process 614 that transmits the report to a server.

Reference is now made to the following examples, which together with the above descriptions illustrate some exemplary implementations of the systems and/or methods (e.g., code executed by processor(s)) in a non-limiting fashion.

Example 1 relates to an attempt by a component(s) of the web page code to load a disallowed third party script. The set-of-rules define that loading code (e.g., script) from a certain URL (uniform resource locator) is to be prevented, for example, code that check the src property of script elements using logic. The component(s) of the web page code calls the appendChild method (instrumented by the monitoring code) to attempt to attach a script element to the DOM tree. The component(s) of the web page code attempts to load a script URL by modifying the src property (instrumented by the monitoring code) of the script element. Code (e.g., monitoring code, analysis code, or other code executed by a processor(s), as described herein) determines that the URL in src is not approved for loading according to the set-of-rules. Code determines that the action (i.e., loading of the script) is an attempted action that may be prevented by not passing the action to the real DOM. Since the action includes loading of code, the component(s) of the web page code may be in an undetermined state. Code may remove the entire component(s) of the web page code, or other third party media objects that are determined to be responsible for the attempted action. The previous state of the attempted state change may be reported, along with other decision parameters and/or metrics, which may be analyzed (e.g., manually by a human administrator and/or automatically by analysis code) to determine whether the code made the correct decision.

Example 2 relates to a web browser media object (i.e., component(s) of the web page code) that attempts to play a video with a sound volume when sound is not allowed. The set-of-rules define that playing elements that emit a sound is not allowed (e.g., to be prevented). The web browser media object calls the appendChild method (instrumented by the monitoring code) to attempt to attach a video element to the DOM tree. Code (e.g., monitoring code, analysis code, or other code executed by a processor(s), as described herein) determines that the addition of the element is allowed, but instruments and/or monitors the volume state to enforce the set-of-rules. The web browser media object invokes a volume change. The code may identify the volume change attempt (i.e., the action) using the instrumented volume property of the element. When captured using the monitoring code (e.g., instrumentation), code decides the action is a disallowed attempted action and issues instructions to prevent the action. Alternatively or additionally, the code determines that the action is to be virtualized by having the instrumented volume property return the expected property for a query of the property by the web browser media object, but not in fact change the property on the DOM. Alternatively or additionally, since the state expected by the web browser media object may be provided, the web browser media object is in a safe state, and no further removal of the web browser media object (or other related objects) is necessary. When the monitoring code (e.g., instrumentation) is not applied or fails, the code may see the volume change is a reported action. The code may determine that the volume change is a disallowed reported action that a counter action is needed. Alternatively or additionally, the code may determine that the video element volume property is to be reset and/or a muted property activated. Alternatively or additionally, when the web browser media object includes instructions (e.g., code) to respond similarly to different volume changes, the code may decide repeated actions based on the assumption that the web browser media object has entered a problematic state and that the video element and/or web browser media object and/or other related object(s) are to be removed (e.g., deleted, blocked, ignored). The previous state of the attempted state change may be reported, along with other decision parameters and/or metrics, which may be analyzed (e.g., manually by a human administrator and/or automatically by analysis code) to determine whether the code made the correct decision.

Example 3 relates to a component(s) of the web page code that attempts to invoke networks requests beyond a predefined rate. The set-of-rules define a maximum rate for network requests, and optionally the type and/or format of requests (e.g., a set of parameters) that are subject to the maximum rate. The component(s) of the web page code creates an instance of an instrumented DOM XMLHttpRequest object to send a network (e.g., AJAX) request. The monitoring code captures the request. Code analyzes the request to determine whether the attempted action (i.e., the network request) would meet the maximum rate for network requests if allowed to continue, and/or whether the network request is according to define type and/or format. The code determines that the action is an attempted action that may be prevented by delaying the request until a time where sending the request will not exceed the maximum rate of requests optionally according to the type and/or format. Alternatively or additionally, the component(s) of the web page code is defined in a holding state when the original network request time of response cannot be determined (and/or assumed) and the component(s) of the web page code is able to wait at a certain time. The code queues an action to send the network request at the certain time. The code sends the network request. When a response is received, the response is passed back to the component(s) of the web page code through the proper instrumented XMLHttpRequest object callback. Data associated with the action and/or network request, and/or decision parameters and/or metrics may be reported and/or analyzed (e.g., manually by a human administrator and/or automatically by analysis code) to determine whether the code made the correct decision.

Example 4 relates to a component(s) of the web page code that injects disallowed third party objects. The set-of-rules define a prohibition of injection of object elements from predefined URLs (e.g., a list of URLs), or alternatively or additionally, the set-of-rules define a set (e.g., list) of URLs from which objects are allowed to be injected. The component(s) of the web page code injects third party object(s) in a manner in which instrumentation (e.g., monitoring code) fails to capture the injection action. The monitoring code, which monitors the state of the DOM, detects the change due to the injected code, and determines that the action is not allowed according to the set-of-rules. Code determines that the detected action is a reported action, and therefore cannot be prevented. The code determines that the third party object(s) is to be removed from the true DOM tree, and the code removes the third party object(s) from the DOM. The code may determine that one or more of the following are to be removed to ensure continued correct functionality and/or allowed state of the component(s) of the web page code (the code may perform the removal and/or deletion): third party object(s), the component(s) of the web page code, and/or other related objects. Data associated with the injection and/or decision parameters and/or metrics may be reported and/or analyzed (e.g., manually by a human administrator and/or automatically by analysis code) to determine whether the code made the correct decision.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant web page codes will be developed and the scope of the term web page code is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad-scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method for monitoring by a virtual document object model (DOM) firewall executed in response to a web browser request by a web browser rendering a web page, the method executed by at least one hardware processor of a web server hosting the web page code in network communication with a client terminal accessing the web page code hosted by the web-server, the method comprising:

receiving over a network from the web browser executing on the client terminal, a request to access the web page code hosted by the web server;

monitoring, by a monitoring code, at least one of attempted actions and attempted events initiated by each of a plurality of components of the web page code, wherein the at least one of attempted actions and attempted events include instructions for manipulation of a document object model (DOM) of the web page code, and the monitoring code includes a virtual DOM firewall that simulates the DOM by intercepting the at least one of attempted actions and attempted events targeting the DOM without execution of the at least one of attempted actions and attempted events on the DOM;

identifying a deviation from a set-of-rules according to an analysis of the monitored at least one of attempted actions and attempted events, wherein the set-of-rules define allowable manipulation of the DOM, and prohibited manipulation of the DOM;

wherein the virtual DOM firewall is stored on the web server and executed by the hardware processor of the web server in associated with the web page code;

wherein a common set-of-rules is defined for the web page code for execution by the web server when each client terminal of a plurality of client terminals access the web page code, the set-of-rules are stored in association with the web server hosting the web page; and wherein the at least one of attempted actions and attempted events that deviate from the set-of-rules are prevented from execution on the DOM, and the at least one of attempted actions and attempted events that adhere to the set-of-rules are allowed to continue execution on the DOM.

2. The computer-implemented method of claim 1, wherein the monitoring comprises intercepting by the virtual DOM firewall, the at least one of attempted actions and attempted events for manipulation of the DOM, and allowing transmission of the intercepted the at least one of attempted actions and attempted events for manipulation of the DOM when no deviation from the set-of-rules is identified.

3. The computer-implemented method of claim 1, wherein the monitoring comprises intercepting by the virtual DOM firewall, the at least one of attempted actions and attempted events for manipulation of the DOM, and blocking transmission of the intercepted the at least one of attempted actions and attempted events for manipulation of the DOM when the deviation from the set-of-rules is identified.

4. The computer-implemented method of claim 1, wherein the virtual DOM firewall identifies the deviation from the set-of-rules before the DOM is manipulated according to the at least one of attempted actions and attempted events.

5. The computer-implemented method of claim 1, wherein the virtual DOM firewall identifies the deviation from the set-of-rules while the browser of the client terminal is accessing the web page code stored on the web server.

6. The computer-implemented method of claim 1, when the deviation from the set-of-rules is identified, further comprising transmitting by the virtual DOM firewall to the respective component of the web page code, a virtual reply in response to the at least one of attempted actions and attempted events, wherein the virtual reply includes false data indicative of simulated execution of the at least one of attempted actions and attempted events on the DOM without executing the at least one of attempted actions and attempted events on the DOM, wherein the virtual reply enables the web page code to continue execution without deviating from the set-of-rules.

7. The computer-implemented method of claim 6, further comprising generating the virtual reply according to a simulation execution of the at least one of attempted actions and attempted events on the virtual DOM firewall that simulates the DOM without executing the at least one of attempted actions and attempted events on the DOM.

8. The computer implemented method of claim 1, wherein the component of the web page code comprises malicious code injected by the browser executing on the client terminal accessing the web page code.

9. The computer-implemented method of claim 1, further comprising adding an event handler that detects a mutation event to the DOM of the web page and analyzing a stack trace to determine a sub-component of the component associated with code that caused the mutation, and evaluating whether the mutation deviates from the set-of-rules.

10. The computer-implemented method of claim 1, further comprising adding an event handler that detects a mutation event to the virtual DOM firewall that simulates the DOM of the web page and analyzing a stack trace to determine a sub-component of the component associated with code that caused the mutation.

11. The computer-implemented method of claim 1, wherein the virtual DOM firewall overrides JAVASCRIPT™ functions and analyzes a call stack within the JAVASCRIPT™ network request call to identify the component that originated the at least one of attempted actions and attempted events, and identifies a remote server hosting the component.

12. The computer-implemented method of claim 1, wherein the set-of-rules define playing a visual video on a display as an allowable component of the multi-media advertisement, and the set-of-rules define sound as a prohibited component of the multi-media advertisement, wherein a sound component of the multi-media advertisement is blocked while a visual component of the multi-media advertisement is allowed to continue playing on the display.

13. The computer-implemented method of claim 1, wherein the plurality of components include at least one web browser media object is a programmatic advertisement provided by an ad-server for dynamic loading with the web page by the web browser.

14. The computer-implemented method of claim 1, wherein the web page includes a plurality of designations each for placement of a respective component, wherein the web page includes a plurality of monitoring code instruction instances each for loading with an associated respective component, wherein the monitoring is performed by each monitoring code instance of the associated respective component, and wherein the identification of the deviation of each respective component is performed according to a respective set-of-rules defined for each respective component.

15. The computer-implemented method of claim 14, wherein each monitoring code instance monitors the associated respective component without monitoring other content of the web page or other components being monitored by other monitoring code instances.

16. The computer-implemented method of claim 14, wherein each monitoring code instance and associated component are loaded together within a respective frame of the web page, wherein the monitoring code instance monitors the at least one of attempted actions and attempted events from the associated component within the respective frame.

17. The computer-implemented method of claim 16, wherein the set-of-rules define the maximum loaded size of the component, and identifying comprises identifying a deviation above the maximum loaded size of the loaded component.

18. The computer-implemented method of claim 1, wherein the set-of-rules define undesired parameters leading to a degradation of a user experience of a user using the web browser to access the web page.

19. The computer-implemented method of claim 1, wherein the set-of-rules includes at least one member of the group consisting of: statistically significant network usage, statistically significant processing resource utilization, statistically significant user noticeable slow-down in loading of the web page, statistically significant user noticeable slowdown in execution of other applications running on the client terminal, and detection of malware.

20. The computer-implemented method of claim 1, further comprising recursively monitoring loading of sub-frames within a loaded parent frame of the web page, and recursively monitoring the component within the loaded sub-frame and parent frame.

21. The computer-implemented method of claim 1, wherein monitoring comprises monitoring network activity associated with the monitored component.

22. The computer-implemented method of claim 1, wherein the set-of-rules is designed to detect at least one member of the group consisting of: component associated with an advertiser bot, frequency capping, and re-targeting.

23. The computer-implemented method of claim 1, wherein the set-of-rules define prohibited activity as activation of sound by the component.

24. The computer-implemented method of claim 1, further comprising identifying the at least one of attempted actions and attempted events executed by each sub-component of the component to identify which certain sub-component of the component caused the deviation from the set-of-rules.

25. The computer-implemented method of claim 1, wherein monitoring comprises monitoring each technological platform implementation of the component.

26. The computer-implemented method of claim 25, wherein the technological platform implementation includes at least one member of the group consisting of: at least one programming language used to create the component, DOM representation of the component, interface used by the component, and network activity due to the component.

27. The computer-implemented method of claim 1, further comprising creating a call chain of sub-components of each component.

28. The computer-implemented method of claim 27, wherein the call chain is created by analyzing call stacks to identify the connectivity between the sub-components of the component.

29. The computer-implemented method of claim 1, wherein the component includes a plurality of links to a plurality of resources located on at least one remote server, wherein the resources include instructions for execution by the web browser of the client terminal, wherein the resources are arranged in a hierarchy such that a first resource includes instructions to execute at least one second resource, further comprising tracking loading of each of the plurality of resources and creating a dependency graph representing the loading relationship between resources, wherein nodes of the graph represent resources of the component.

30. The computer-implemented method of claim 29, wherein tracking loading comprises at least one member selected from the group consisting of: time of loading relative to the start of the loading process of the web page, the location of the component resource in the web page relative to the root of a DOM of the web page.

31. The computer-implemented method of claim 29, wherein the dependency graph includes weights assigned between nodes of the graph representing at least one of the loading time and distance based on the screen location.

32. The computer-implemented method of claim 31, wherein the loading relationship of resources of components of the web page are analyzed for each loading session of the web page and added to a common graph created for the component representing an average of weights based on multiple sessions.

33. The computer-implemented method of claim 32, further comprising applying a machine learning method to the graph to identify component resources violating the set-of-rules.

34. The computer-implemented method of claim 1, further comprising blocking at least one component identified as deviating from the set-of-rules by automatically removing a designation for requesting the at least one component from the code of the web page.

35. A system for monitoring by a virtual document object model (DOM) firewall executed in response to a web browser request by a web browser rendering a web page, the system comprising:
 a non-transitory memory having stored thereon a code for execution by at least one hardware processor of a web server hosting web page code in network communication with a client terminal accessing the web page code hosted by the web-server, the code comprising:
  code for receiving over a network from the web browser executing on the client terminal, a request to access the web page code hosted by the web server;
  code for monitoring, by a monitoring code, at least one of attempted actions and attempted events initiated by each of a plurality of components of the web page code, wherein the at least one of attempted actions and attempted events include instructions for manipulation of a document object model (DOM) of the web page code, and the monitoring code includes a virtual DOM firewall that simulates the DOM by intercepting the at least one of attempted actions and attempted events targeting the DOM without execution of the at least one of attempted actions and attempted events on the DOM;
  code for identifying a deviation from a set-of-rules according to an analysis of the monitored at least one of attempted actions and attempted events, wherein the set-of-rules define allowable manipulation of the DOM, and prohibited manipulation of the DOM;
  wherein the virtual DOM firewall is stored on the web server and executed by the hardware processor of the web server in associated with the web page code;
  wherein a common set-of-rules is defined for the web page code for execution by the web server when each client terminal of a plurality of client terminals access the web page code, the set-of-rules are stored in association with the web server hosting the web page; and
  wherein the at least one of attempted actions and attempted events that deviate from the set-of-rules are prevented from execution on the DOM, and the at least one of attempted actions and attempted events that adhere to the set-of-rules are allowed to continue execution on the DOM.

36. A computer program product for monitoring by a virtual document object model (DOM) firewall executed in response to a web browser request by a web browser rendering a web page, the computer program product comprising:
 a non-transitory memory having stored thereon a code for execution by at least one hardware processor of a web server hosting web page code in network communication with a client terminal accessing the web page code hosted by the web-server, the code comprising:
  instructions for receiving over a network from the web browser executing on the client terminal, a request to access the web page code hosted by the web server;

instructions for monitoring, by a monitoring code, at least one of attempted actions and attempted events initiated by each of a plurality of components of the web page code, wherein the at least one of attempted actions and attempted events include instructions for manipulation of a document object model (DOM) of the web page code, and the monitoring code includes a virtual DOM firewall that simulates the DOM by intercepting the at least one of attempted actions and attempted events targeting the DOM without execution of the at least one of attempted actions and attempted events on the DOM;

instructions for identifying a deviation from a set-of-rules according to an analysis of the monitored at least one of attempted actions and attempted events, wherein the set-of-rules define allowable manipulation of the DOM, and prohibited manipulation of the DOM;

wherein the virtual DOM firewall is stored on the web server and executed by the hardware processor of the web server in associated with the web page code;

wherein a common set-of-rules is defined for the web page code for execution by the web server when each client terminal of a plurality of client terminals access the web page code, the set-of-rules are stored in association with the web server hosting the web page; and wherein the at least one of attempted actions and attempted events that deviate from the set-of-rules are prevented from execution on the DOM, and the at least one of attempted actions and attempted events that adhere to the set-of-rules are allowed to continue execution on the DOM.

* * * * *